US008713579B2

(12) United States Patent
Cardelli et al.

(10) Patent No.: US 8,713,579 B2
(45) Date of Patent: Apr. 29, 2014

(54) MANAGING JOB EXECUTION

(75) Inventors: Marco Cardelli, Rome (IT); Pietro Lannucci, Rome (IT); Valeria Perticara', Rome (IT); Randa Salem, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/412,041

(22) Filed: Mar. 5, 2012

(65) Prior Publication Data
US 2012/0260260 A1    Oct. 11, 2012

Related U.S. Application Data

(62) Division of application No. 12/415,452, filed on Mar. 31, 2009.

(51) Int. Cl.
*G06F 9/455* (2006.01)
*G06F 9/46* (2006.01)

(52) U.S. Cl.
USPC .......................................... 718/106

(58) Field of Classification Search
None
See application file for complete search history.

(56) References Cited

U.S. PATENT DOCUMENTS

| 6,243,863 | B1 * | 6/2001 | Kothari et al. ................ 717/149 |
| 7,712,096 | B2 * | 5/2010 | Kaczynski et al. ............ 718/101 |
| 8,601,454 | B2 * | 12/2013 | Christophe ................... 717/151 |
| 2003/0149717 | A1 | 8/2003 | Heinzman | |
| 2005/0138600 | A1 * | 6/2005 | Pavlovic et al. .............. 717/104 |
| 2007/0016907 | A1 | 1/2007 | Benedetti | |
| 2007/0174101 | A1 * | 7/2007 | Li et al. ............................. 705/8 |
| 2008/0010642 | A1 * | 1/2008 | MacLellan et al. ........... 718/102 |

* cited by examiner

*Primary Examiner* — Corey S Faherty
(74) *Attorney, Agent, or Firm* — Brevetto Law Group

(57) ABSTRACT

Various embodiments involve monitoring the execution of jobs in a work plan. For example, a system maintains a risk level associated with the critical job may be maintained to represent whether the execution of a job preceding the critical job has a problem, and a list associated with the critical job may be maintained so as to quickly identify the preceding job which may cause a delay to the critical job execution.

11 Claims, 4 Drawing Sheets

MANAGING JOB EXECUTION

CROSS-REFERENCE TO RELATED APPLICATIONS

This application is related to, claims priority from, and hereby incorporates by reference in their respective entireties the following two patent applications: European Patent application EP09156114.2 filed Mar. 25, 2009 and U.S. patent application Ser. No. 12/415,452.

FIELD OF DISCLOSURE

The present disclosure relates to managing execution of jobs.

BACKGROUND

In a scheduling environment with a complex workflow of batch and interactive processes, some jobs may be defined as highly critical for the business because they have a service level agreement (SLA) deadline negotiated with customers.

SUMMARY

A method comprising receiving a workload plan of jobs, wherein the workload plan of jobs includes a critical job and a predecessor job, wherein the predecessor job must complete execution before the critical job can begin execution, and wherein the critical job must be completed by a deadline; monitoring execution of jobs in the workload plan; determining an ability of the critical job to complete its execution before the deadline based on an execution status of the predecessor job; and updating a risk level associated with the critical job based on the determination.

BRIEF DESCRIPTION OF THE DRAWINGS

Embodiments of the present invention will now be described by way of example with reference to the accompanying drawings in which like references denote similar elements, and in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods may be described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

As the inventors herein have recognized, if a problem occurs with a job that does not belong to the critical path, and if that problem is ignored until the job becomes part of the critical path, then it may be undesirable to begin tackling the problem at that time.

Figure 1:
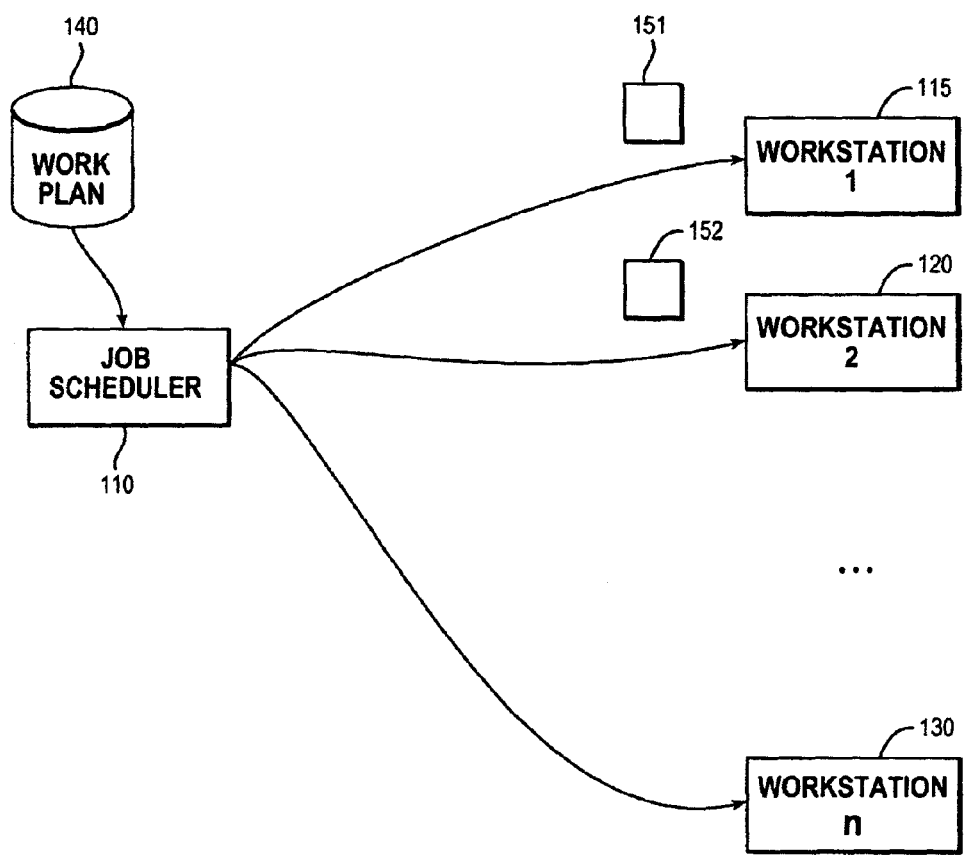
FIG. 1 shows an example of a system in which an embodiment of the present invention can be implemented.

FIG. 1 shows an example of a system in which an embodiment of the invention may be implemented. The system may include a job scheduler (110) and a set of workstations. The set of work stations may include workstation 1 (115), workstation 2 (120), workstation n (130). A work plan (140) may be received by the job scheduler (110). A first job (151) may be sent to the workstation 1 (115) for execution. A second job (152) may be sent to the workstation 2 (120) for execution, and so on.

The work plan (140) may include a set of jobs to be executed. Based on the work plan (140), each job may be associated with an estimated duration, a latest start time and an estimated end time, and/or other information relating to the job. Each job may depend on one or more of the jobs of the work plan (140). Some jobs in the work plan (140) may be particularly important because they are associated with a service level agreement (SLA). Such jobs may be called critical jobs. The jobs on which a critical job depends may form a critical network of this critical job. This will be described in more detail with respect to FIG. 2.

The job scheduler (110) may analyze the work plan (140). It may distribute the jobs (151, 152) to the different available workstations (115, 120, 130) for execution. The job scheduler (110) may also monitor the jobs execution and the execution status associated with a job. The execution status may correspond to the state of the execution of a job on a particular workstation. It may correspond to the state of the job itself and/or to the state of the infrastructure on which the job must execute. By way of example, the execution states of a job may be:

'not started', when the job execution has not started yet;

'started', when the job execution has started;

'late', when the job is approaching its latest start time but has not yet started;

'long', when the job execution takes longer than its estimated duration;

'error', when the job execution is in error;

'stalled', when the job execution is stuck for instance in an infinite loop, but an error has not been detected; and 'suppressed', when an expected condition to suppress the job is met such that the job is marked not to run; the job stream is in error and/or stuck such that the execution is interrupted; and/or a user response is needed (for instance a prompt is not answered) in order for the job to start.

Also by way of example, the execution status relating to the infrastructure may be:

the workstation that is supposed to be running jobs of the critical network has become off-line, and thus the job will not start;

a resource which is required for a job to execute has become unavailable, and thus the job will not start;

the maximum number of jobs that can run concurrently (i.e., a job's "limit") is lowered on the job stream or a workstation, and thus the job will not start if the limit is zero or has already been met; and/or a priority level is set (i.e., a "fence" is lowered) which may result in the job or job stream not starting, because only jobs and/or job streams whose priority exceed the fence can run on that work station.

Figure 2:
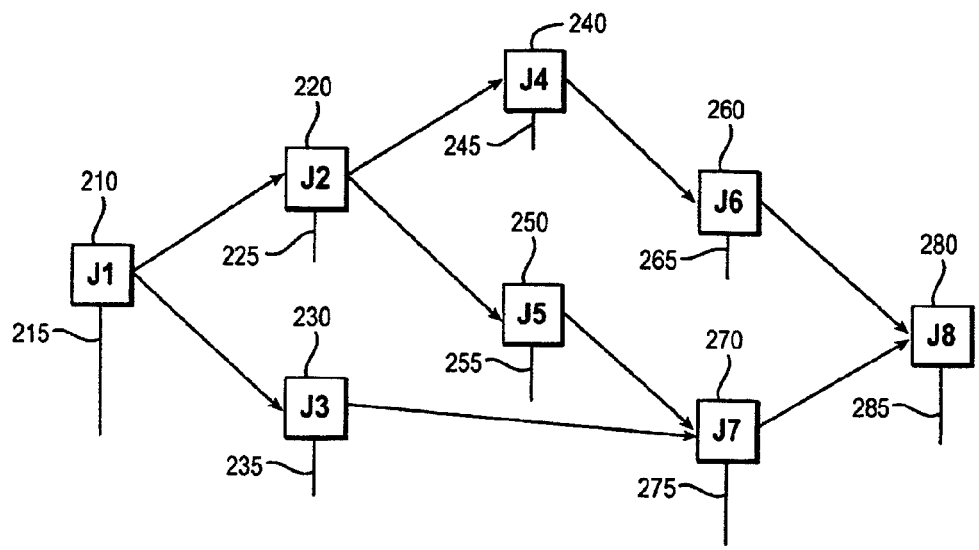
FIG. 2 shows an example of a critical network of a critical job along with an estimated duration for each job.

A job in the critical network of a critical job may impact the critical job to a point that it could miss a deadline defined by the SLA. In an embodiment of the invention, the job scheduler (110) may maintain a list of jobs in the critical network of a critical job which could potentially impact the critical job. This will be described in more detail with respect to FIG. 5. In an embodiment, the existence of a job which could impact the critical job to a point that it could miss the deadline defined by the SLA, may be represented in the meta data of the critical job itself. This representation will be described in more detail with respect to FIG. 4. FIG. 2 shows an example of a critical network of a critical job along with the estimated duration for each job. The critical network may include a job J1 (210) having an associated estimated duration (215); a job J2 (220) having with an associated estimated duration (225); a job J3 (230) having an associated estimated duration (235) longer than the estimated duration of J2 (225); a job J4 (240) having an associated estimated duration (245); a job J5 (250) having an associated estimated duration (255) longer than the estimated duration of J4 (245); a job J6 (260) having an associated estimated duration (265); a job J7 (270) having an associated estimated duration (275) longer than the estimated duration of J6 (265); and a critical job J8 (280) having an associated estimated duration (285).

In this example, J6 (260) and J7 (270) must be executed successfully for J8 (280) to execute. J3 (230) and J5 (250) must be executed successfully for J7 (270) to execute. J4 (240) must be executed successfully for J6 (260) to execute. J2 (220) must be executed successfully for J5 (250) and J4 (240) to execute. J1 (210) must be executed successfully for J2 (220) and J3 (230) to execute. Accordingly, J1 (210), J2 (220), J3 (230), J4 (240), J5 (250), J6 (260), J7 (270) form the critical network of J8 (280). J8 (280) may be included in the critical network or not. The critical network may be represented as a directed graph having the jobs as nodes, and the estimated duration of a job being the weight associated with the arc for which said job is the head. The critical network may include the group of jobs which are defined to run before the critical job and which are predecessors of the critical job. The critical job may not start until the critical network jobs have completed successfully.

In an embodiment, the critical path may be a subgraph of the critical network and may correspond to the path in the critical network having the most weight, i.e. the longest estimated duration. In an embodiment, the critical path may correspond to the path in the critical network having the latest end time. In the critical network presented in FIG. 2, the critical path may include jobs J1 (210), J2 (220), J5 (250) and J7 (270). J8 (280) may be included in the critical path, or not. The jobs of the critical path may be particularly important to monitor, as a problem with the execution of such a job may impact the critical job, with a high likelihood of making the critical job miss the deadline associated with the SLA.

The latest start time of the job may be the time by which a job must start so as not to miss its deadline. The latest start time of the job may be defined simply as the deadline minus the estimated duration of the job. Some security margin may be built in the work plan (140) so that the plan start time may be scheduled to happen before the latest start time. The slack time of the job may correspond to that security margin, and may be defined as the deadline minus the plan start time minus the estimated duration of the job.

It may not be necessary to associate a deadline with each job. In an embodiment, only the critical jobs have an associated deadline which is defined by the SLA. However the deadline of the job which is not a critical job may be defined as the latest start time of its direct successor. If a job has several direct successors, such as J2 (220) or J1 (210), then the deadline may be defined as the earliest latest start time of the direct successors. For example J2 (220) has J4 (240) and J5 (250) as direct successors. J5 (250) being on the critical path, it may have a latest start time earlier than the latest start time of J4 (240). Hence the deadline of J2 (220) may be the latest start time of J5 (250).

The estimated duration of a job may be defined in the work plan (140). This estimated duration may be computed as an average of the previous durations of similar jobs. It may also be defined as the duration such that a certain percentage of the jobs will last a shorter time than this duration. Statistical analysis may be used to estimate the duration of the job. The estimated end of a job may be the time a job is supposed to end based on its estimated duration, its dependencies (for example time dependencies, resource usage, job dependencies and so on) and its current state.

To monitor for correct execution of a job J8 (280), it may not be sufficient to only monitor J8 (280) itself, or its critical path. In an embodiment of the invention, all the jobs in the critical network may be taken into account so that any problem which occurs in the critical network can be tackled in time.

Figure 3:
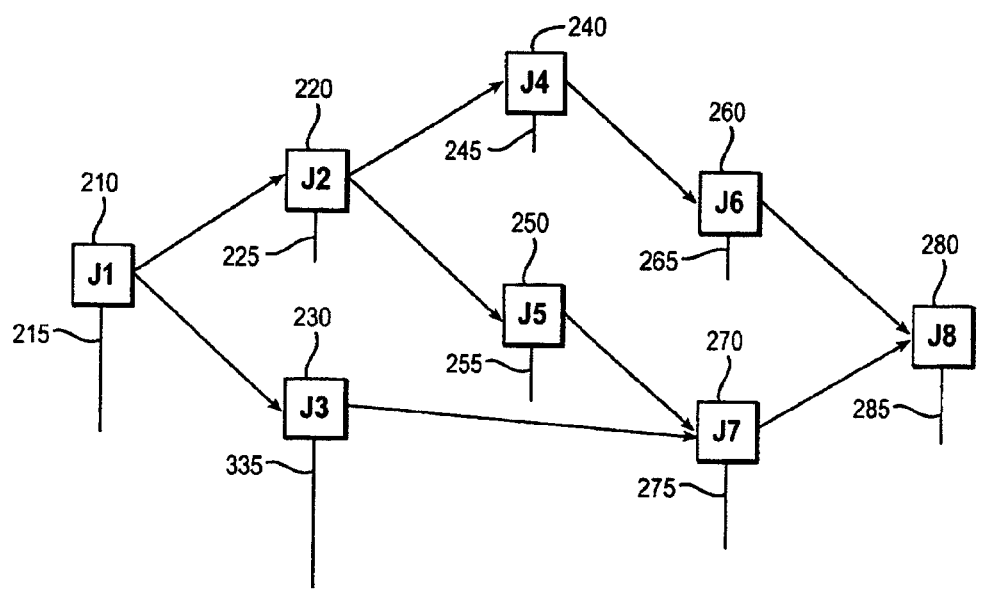
FIG. 3 shows an example of the same critical network as in FIG. 2, but with a different estimated duration for one job.

FIG. 3 shows an embodiment of the same critical network as in FIG. 2, but with J3 (230) having a different estimated duration (355). The new estimated duration may be caused by several factors relating to the execution status of J3 (230) as described with respect to FIG. 1. The potential impact on the critical job of this change in the execution status of J3 (230) will be described in more detail with respect to FIGS. 4 and 5.

As J3 (230), after the change in the execution status, would take more time to execute than J2 (220) and J5 (250), the critical path of the critical network has changed. The critical path now includes the following jobs J1 (210), J3 (230), J7 (270). J8 (280) may be included in the critical path or not. Recomputing the entire critical path can be a costly operation. In an embodiment the critical path may not be recomputed immediately but after a time delay. The determination of the time delay will be described in more detail with respect to FIG. 4.

Figure 4:
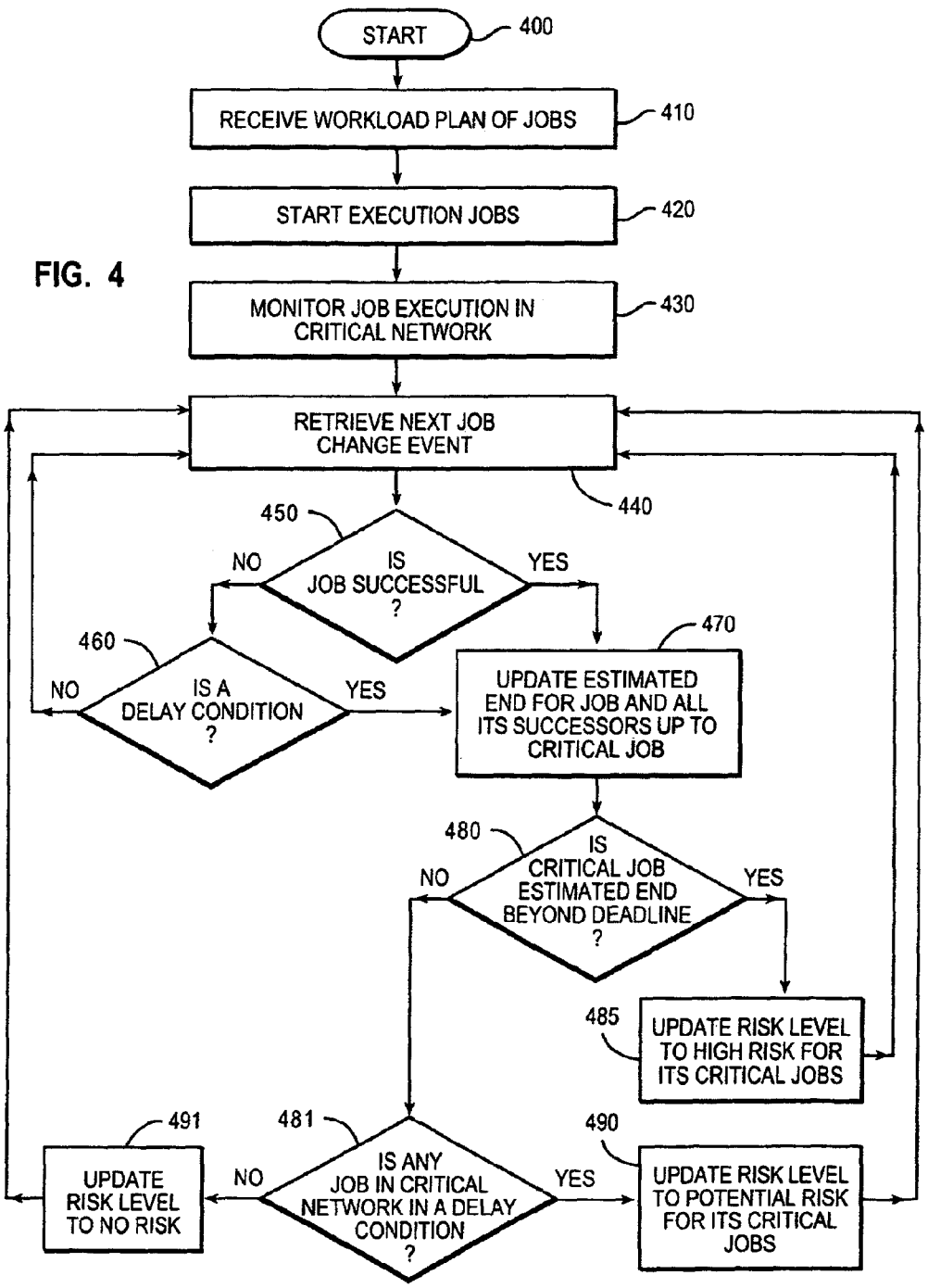
FIG. 4 shows an example of a process for analyzing the impact on a critical job of a change event in a job execution status.

FIG. 4 shows an example of a process for analyzing the impact of a change event in a job execution status on a critical job. The process starts (400) and may include receiving the workload plan (140) of jobs (410), starting the execution of jobs (420), monitoring the job execution in the critical network (430), retrieving the next job change event (440), and checking whether the job is successful (450). If it is determined that the job is not successful, the process may include determining whether the change event is a delay condition (460). If it is determined that the change event is not a delay condition, the process may include retrieving the next job change event (440).

If it is determined that the job was successful or if it is determined that the change event is a delay condition, the process may include updating the estimated end for the job and its successors up to the critical job (470) and determining whether the critical job estimated end time is beyond the deadline (480). If it is determined that the critical job estimated end time is beyond the deadline, the process may include updating the risk level to 'high risk' for the critical jobs (485), and may return to retrieving the next job change event (440).

If it is determined that the critical job estimated end time is not beyond the deadline, the process may include determining whether any job in the critical network of the critical job is in a delay condition (481). If it is determined that a job in the critical network of the critical job is in a delay condition, the process may include updating the risk level to 'potential risk' for the critical jobs (490), and may return to retrieving the next job change event (440).

If it is determined that no jobs in the critical network of the critical job is in delay condition, the process may include updating the risk level to 'no risk' for the critical jobs (491), and may return to retrieving the next job change event (440).

For each event received by the job scheduler (110) relating to the execution status of a job (440), the job scheduler (110) may check whether the job is successful (450). If it is, the job scheduler (110) may update the estimated end for the job and all its successors up to the critical job (470). If the job is not successful, then the job scheduler (110) may determine whether the event received corresponds to a delay condition or not (460).

A delay condition (for example late start, long duration or error status) may be caused by a change in the execution status of a job, as described with respect to FIG. 1. If the event received corresponds to a delay condition, the job scheduler (110) may update the estimated end for the job and all its successors up to the critical job (470). If not, the job scheduler (110) may process the next event corresponding to a change of a job execution status (440). After the job scheduler (110) has determined whether a critical job estimated end is beyond its deadline or not (480). If it is determined to be beyond its deadline, the risk level associated with this critical job is set to 'high-risk' (485). If it is not determined to be beyond its deadline, it is determined whether any job in the critical network is in a delay condition (481). If it is determined that a job in the critical network is in a delay condition, then the risk level associated with this critical job may be set to 'potential risk' (490). If it is determined that there are no jobs in the critical network in a delay condition, then the risk level may be updated to 'no risk' (491).

During the monitoring phase, each time the scheduler (110) receives an event related to a job which is in the critical network, the job scheduler may undergo a series of actions to determine the impact of the execution status change corresponding to the received event on the critical job and in its ability to meet the deadline defined by the SLA.

In an embodiment, for each critical job, the job scheduler (110) may maintain a list of jobs belonging to the critical network of that critical job, and which may have an impact on the ability of the critical job to meet its deadline. This list is called thereafter the hotlist of a critical job. The management of this list is described in more detail with respect to FIG. 5.

Each time the scheduler receives an event corresponding to a change in the execution status of a job, noted hereafter jobX, belonging to the critical network of a critical job, the risk level of the critical job may be updated as described in the following paragraphs.

If jobX is in a delay condition (460), the job scheduler (110) may update the risk level to 'potential' for all the critical jobs that are successors of jobX and a high risk level equal to no risk, jobX may be added to the hotlist of booze critical jobs.

If the received event corresponds to an execution status which fixes a delay condition (for example the completion of a long-running job or a restart of a job which ended in error), the job scheduler (110) may remove jobX from the hotlist of all the critical jobs that are successors of jobX, and may reset the risk level to no risk for those critical jobs which have a risk level equal to potential and which have an empty hot list.

When the received event corresponds to a job termination all to a delay condition, the job scheduler (110) may perform additional processing. For example, the job scheduler (110) may update the estimated end time for jobX and all its successors up to the critical jobs. Additionally, if a critical job end time is beyond its expected deadline, the job scheduler (110) may update its risk level to 'high'; if a critical job end time is before the expected deadline and the risk level is high if the hotlist is empty reset its risk level to 'no risk'; otherwise if the hotlist is not empty reset the risk level to 'potential'.

The computation of the estimated end time for jobX and all its successors is may be a costly operation. Rather than executing this computation immediately, it may be possible to perform this computation later, so as to leave time for the system to fix the problem which caused the job to finish after its planned estimated end time. To that end the remaining slack time of the network of jobs may be used to set the timer which may indicate when the recomputation must take place if the delay condition has not been fixed. This remaining slack time can be defined as the slack time before the delay condition has been detected minus the job delay for which an event was received. If this remaining slack time is positive it may then be safe to wait so as to save some CPU time.

When the estimated end time of a job for which a delay condition was detected changes, it may be necessary to recompute the critical path of the critical network, as described for instance with respect to FIG. 3. However this computation may be expensive. In an embodiment this recommendation may not be performed immediately, but can be scheduled later. The time delay at which the recomputation can be scheduled may be determined in the following manner. The job scheduler (110) may start from the job for which an event was received and may find among its direct successors the one with the latest estimated end time. This may be repeated until the found job belongs to the critical path or is the critical job itself. The difference may be computed between the estimated end times of the job which is a direct predecessor of the job in the critical path found in the previous step, and the job which is a direct predecessor of the job in the critical path found in the previous step and a successor of the job for which an event was received. The difference between these two values is the time delay at which a recomputation may be scheduled.

For example, in the critical network depicted in FIG. 2, the critical path consists of the jobs J1 (210), J2 (220), J5 (250) and J7 (270). If J4 is late, a new estimated end time is calculated for J6, and the new estimated end time of J6 is compared to the estimated end time of J7. If the estimated end time of J6 is after the estimated end time of J7 (i.e., if the estimated end time of J7 minus the estimated end time of J6 results in a negative difference), the critical path should be computed again immediately. On the other hand, if the estimated end time of J7 minus the estimated end time of J6 is 4 minutes, the critical path should be computed again in 4 minutes.

For another example, in the critical network depicted in FIG. 3, if the job for which an event was received is J3 (230), the job in the critical path which is a successor of J3 according to the previous process is J7 (270), the direct predecessor of J7 which belongs the critical path is J5 (250). The job scheduler (110) thus computes the difference between the estimated end time of J5 (250) and the estimated end time of J3 (230). In this example the difference is negative, so the critical path should be computed again immediately. If this difference was positive, then the computation of the critical path could be scheduled at a later time corresponding to that difference, to allow for further execution status change events to be processed.

Hence the risk level indicator of the critical job may allow a user or a system monitoring the execution of jobs to easily identify those critical jobs which have problems, which may be caused not only by jobs which belong to the critical path but also by any job in the critical network, and may evaluate their impact the critical job deadline. Moreover in an embodiment, only this indicator of the critical job may be monitored, and it may possible to identify potential delay conditions before they produce an actual delay to the critical job. The combination of the risk level indicator and the deadline of the critical job may be used to identify a risk order among the critical jobs with the same risk level and to identify which critical jobs need to be handled first. The risk level indicator may represent the health or risk of a critical job and of its critical network. By way of example, three risk levels may be defined: 'no risk', indicating that the critical job is on target, and that its current estimated end time is still earlier than the defined deadline; 'potential risk', indicating that the critical job is still on target but they are some jobs in the critical network whose conditions can cause a delay in the workflow execution; and 'high-risk', indicating that the critical job estimated end time is later than its deadline.

Furthermore the comparison of the estimated end time and the deadline associated with a critical job may provide a measure of the time left before the potential risk becomes higher risk if the delay cause is not fixed. Thus by monitoring only the critical job and not the whole network of its predecessors it may be possible to detect problems which can cause the critical job to miss the deadline and address them in a timely manner.

Figure 5:
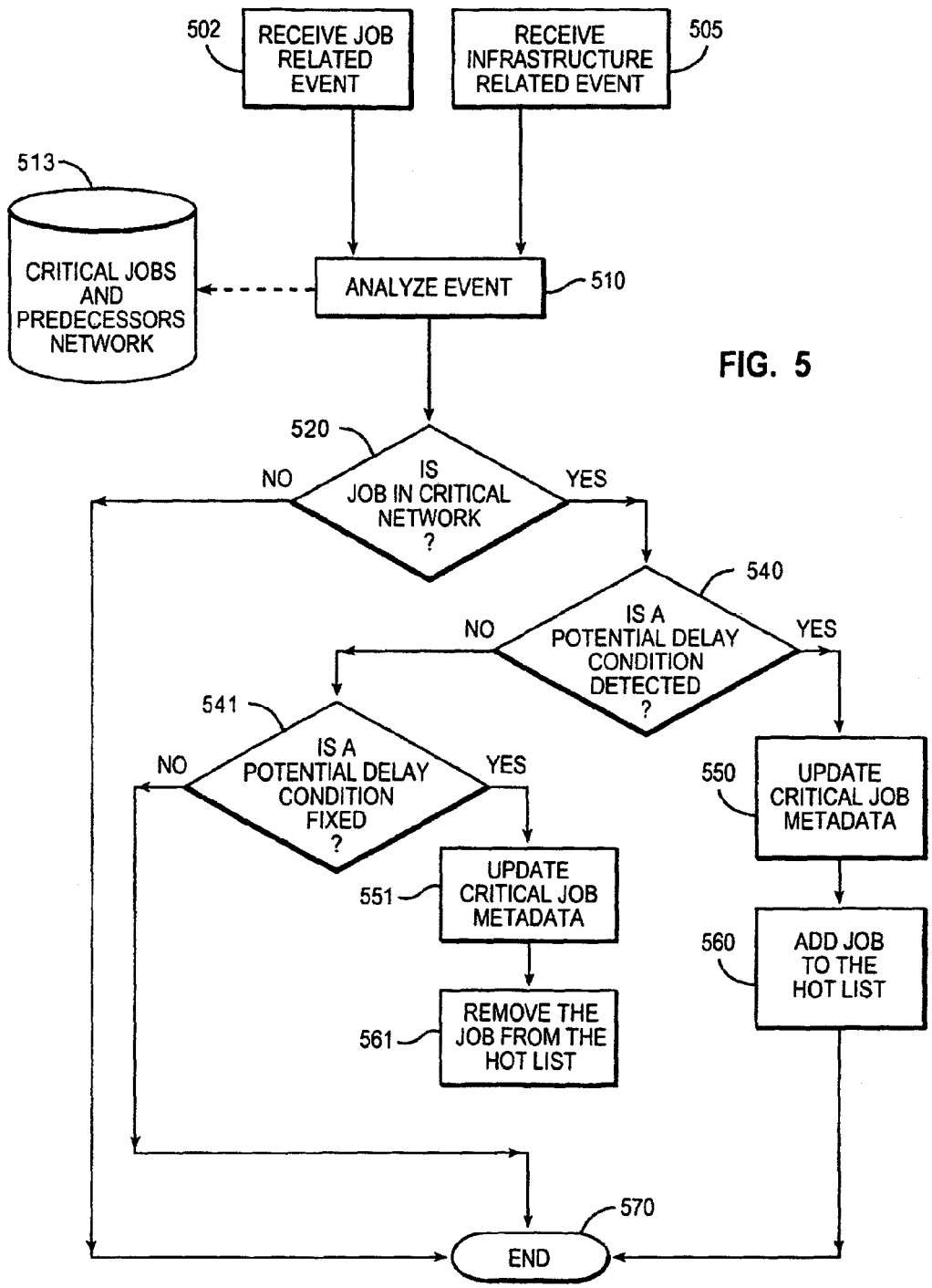
FIG. 5 shows an example of a process for identifying the jobs which must be closely monitored for the critical job to meet its service level agreement (SLA).

FIG. 5 shows an example of a process for identifying jobs which may be closely monitored for the critical job to meet its SLA. The process may include receiving a job-related event (502), receiving an infrastructure related event (505), analyzing the received event (510) taking into account the critical job and the critical network (513), determining whether the job to which the event relates is in a critical network (520), determining whether a potential delay condition is detected (540). If a potential delay condition is detected, the process may include updating the critical job meta data (550), and adding the job for which a potential delay condition has been detected to the hotlist (560). If a potential delay condition is not detected, the process may include determining whether a potential delay condition is fixed (541). If a potential delay condition is fixed, the process may include updating the critical job meta data (551), and removing the job for which a potential delay condition has been fixed from the hotlist (561). The process may then end (570).

When monitoring the possible problems which may impact the critical job to end beyond its deadline, the job scheduler (110) may take into account time delay aspects of jobs preceding the critical job, and may also take into account a list of non-time related or external conditions which may have a potential impact on the critical job if not managed in time. Hence the job scheduler may analyze events (510) relating to the execution of a job (502) and also to the infrastructure on which the job is supposed to execute (505) what type of events can be considered as relating to the execution status of a job.

If the job for which an execution status event is received does not belong to a critical network, meaning there is no critical job in the work plan (140) which is a successor of this job, then there may be no need to further analyze the impact of the job and the process ends (570).

Once the critical jobs which are successors of the job are determined along with the corresponding critical networks, the job scheduler may determine whether the received event corresponds to a potential delay condition (540) or whether it fixes a potential delay condition (541). The potential delay condition can be for instance that the job is running longer than expected or is in error, or that the workstation on widget was supposed to one has gone off-line. Further examples have been described with respect to FIG. 1.

The risk level of the critical job may then be updated (550) to potential risk, high-risk or no risk (485, 490), as described with respect to FIG. 4. The job for which the event that identifies a potential delay condition was received may be added to the hotlist of the critical job (560). The job for which the event that fixes a potential delay condition was received is removed from the hotlist of the critical job (561). If the received event corresponds to a fixed delay condition, the risk level of the critical job may be updated to no risk. Each critical job may be associated with a hotlist which contains the list of predecessor jobs which may cause the critical job to miss its deadline. The hotlist may thus be a different representation of important jobs for the SLA from the critical path. In addition to the jobs in the critical path, the jobs in the hotlist may also be monitored to address problems with these jobs as early as possible. The ability to maintain this list at the critical job level may help keep the computation cost of such list low.

When a job is added to a hotlist, it may be possible to associate it with further attributes to represent that the job belongs to a hotlist. The attributes may also include the cause for being in the hotlist, and the latest start time for a job that would need to be satisfied in order to avoid a real impact of this job on the critical job. This latter attribute may be further leveraged when ordering the jobs in the hotlist by their late latest start time, so as to indicate which job should be tackled first. The hotlist may be accessed either through an API or may be presented to a user in a user interface.

An embodiment may include monitoring the execution of jobs in a work plan. In an embodiment, a system may maintain a risk level associated with the critical job to represent whether the execution of a job preceding the critical job has a problem, and it may maintain the list associated with the critical job so as to quickly identify the preceding job which may cause a delay to the critical job execution.

A risk level may be maintained that is associated with the critical job to represent whether the execution of a job preceding the critical job so as to represent whether the execution of a job preceding the critical job has a problem, and a list may be maintained that is associated with the critical job so as to quickly identify the preceding job which may cause a delay to the critical job execution. By monitoring the risk level of the first job only (the critical job associated with an SLA), in an embodiment it may be possible to detect problems of any jobs in the critical network, rather than polling the status of each job in the critical network. In an embodiment it may be possible to identify potential delay conditions before they produce actual delay to the critical job. In an embodiment it may be possible to identify which jobs may cause a delay to the critical job, even though they are not part of the critical path.

In an embodiment, the latest execution status for each job in the work plan may be made available, and may help identify which job should be tackled first. In an embodiment, situations which may cause a delay in the critical job may be taken into account. In an embodiment, it may not be necessary to recompute the critical path immediately when a job is detected as potential delay, even though the critical path may be one of the most important factors for the critical job to meet the SLA.

An embodiment of the invention may be reproduced and run on different computer systems. In an embodiment, a computer readable medium may be used to simplify installation on various apparatus.

The embodiments of the invention may take the form of an entirely hardware embodiment, an entirely software embodiment or an embodiment containing both hardware and software elements. In an embodiment, the invention may be implemented in software, which includes but is not limited to firmware, resident software, microcode, etc.

Furthermore, embodiments of the invention may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, and/or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method comprising:
    receiving a workload plan of jobs, wherein the workload plan of jobs includes a critical job and a predecessor job, wherein the predecessor job must complete execution before the critical job can begin execution, and wherein the critical job must be completed by a deadline;
    monitoring execution of jobs in the workload plan;
    determining an ability of the critical job to complete its execution before the deadline based on an execution status of the predecessor job; and
    updating a risk level assigned to the critical job based on the determination, wherein said risk level is updated before execution of the critical job begins;
    wherein the critical job and the predecessor job are in a critical path comprising one or more successor jobs which are successors to said predecessor job and must complete execution before the critical job can begin execution.

2. The method of claim 1, further comprising:
    associating an estimated end time, a deadline, and a risk level with the critical job.

3. The method of claim 1, further comprising:
    receiving the execution status of the predecessor job.

4. The method of claim 3, further comprising:
    associating the predecessor job, the execution status of the predecessor job, and a latest start time of the predecessor job with the critical job.

5. The method of claim 4, further comprising:
    recomputing the latest start time of the predecessor job based on the execution status of the predecessor job.

6. The method of claim 3, wherein the execution status of the predecessor job corresponds to at least one of a job event or an infrastructure event.

7. The method of claim 1, further comprising:
    associating a first directed graph of jobs with the critical job, wherein each job of the first directed graph of jobs is assigned to an estimated execution duration.

8. The method of claim 1, wherein the deadline is a first deadline and a scheduled time for completing the predecessor job is a second deadline, the method further comprising:
    determining that the predecessor job will not be completed by the second deadline;
    wherein the predecessor job must be completed by at least a latest successor job start time of the predecessor job's direct successor in order for the critical job to be completed by the first deadline.

9. The method of claim 8, further comprising:
    creating an updated second deadline based on a new completion estimate for the predecessor job;
    wherein the updating of the risk level assigned to the critical job is based on the determination and the updated second deadline.

10. The method of claim 1, wherein the deadline for the critical job to complete its execution is based on a service level agreement (SLA) between a business and a customer of the business.

11. The method of claim 1, wherein the execution status of the predecessor job includes both time related aspects and non-time related aspects impacting the predecessor job.

* * * * *